United States Patent [19]
Weverka

[11] Patent Number: 5,144,468
[45] Date of Patent: Sep. 1, 1992

[54] MIXING INTERFEROMETER USED AS A COMMUNICATIONS LINK

[75] Inventor: Robert T. Weverka, Boulder, Colo.

[73] Assignee: Honeywell Inc., Minneapolis, Minn.

[21] Appl. No.: 367,395

[22] Filed: Jun. 16, 1989

[51] Int. Cl.$^5$ .......................................... H04B 10/12
[52] U.S. Cl. .................................. 359/173; 359/161
[58] Field of Search ............... 455/612, 617, 618, 619;
370/3; 359/161, 173

[56] References Cited

U.S. PATENT DOCUMENTS

| | | | |
|---|---|---|---|
| 3,752,992 | 8/1973 | Fluhr | 455/611 |
| 4,748,686 | 5/1988 | Glomb | 455/612 |
| 4,755,016 | 7/1988 | DeLoach | 455/618 |
| 4,868,898 | 9/1989 | Gilden | 455/612 |
| 4,893,352 | 1/1990 | Welford | 455/619 |

FOREIGN PATENT DOCUMENTS

0168192  1/1986  European Pat. Off. ............ 455/619

Primary Examiner—Edward L. Coles, Sr.
Assistant Examiner—L. Pascal
Attorney, Agent, or Firm—John G. Shudy, Jr.; Donald J. Lenkszus

[57] ABSTRACT

An interferometer, such as a fiberoptic Mach-Zehnder type, is equipped at a transmission end of the system with a phase modulator driven by a data-input signal to be transmitted; and at a reception end with another phase modulator driven by a large reference signal. Nonlinear dependence of output intensity on these signals yields an intensity component that is the product of the signals at the modulators; and in turn an electrical output-signal component at frequency equal to the difference between the data- and reference-signal frequencies. A servocontrolled phase bias holds the system near a minimum in overall light level, where nonlinearity is prominent while intensity-related noise is minimized. The reference source and the bias are at the receiver end of the system, providing advantages: (1) the reference signal can be tuned manually or dynamically to optimize reproduction of the input signal, (2) the detector output can be mixed back up to the original data-input frequency using the same reference for mixing up as used optically for mixing down—eliminating frequency error and drift, and excess phase noise; and (3) only the modulators and purely optical elements need operate near the data frequency, which may be very high, while the detector and its amplifier run at the difference frequency.

23 Claims, 2 Drawing Sheets

MIXING INTERFEROMETER USED AS A COMMUNICATIONS LINK

BACKGROUND

1. Field of the Invention

This invention relates generally to optical communication links; and more particularly to phase modulation in input and reference optical paths, yielding an ultrahigh-fidelity output signal at a difference frequency of the input and reference signals.

Communication links of greatest interest in this field are directed primarily (but not exclusively) to carrying microwave- or radio-frequency data. Digital data may be of principal interest, but analog signals too can be carried on remote links of the type under consideration.

Such data may include several or very many microwave-frequency or RF data signals multiplexed on a single optical carrier. In some cases these individual data signals in turn may represent several or very many lower-frequency data signals, extending even to inclusion of audio signals and other signals in like frequency range.

2. Prior Art

In most telecommunications systems, a design goal is to develop as many channels, and as much data in each channel, as possible—using the smallest possible number of optical fibers or other optical paths. Where fidelity is of utmost importance, however, some known systems dedicate a parallel optical channel for developing a verifying signal of some sort.

Some prior communication systems outside the fiberoptic area have featured mixing or heterodyning the data with a reference signal, and in some cases transmitting the latter along the parallel channel. These systems have suffered from a perceived necessity to place the reference source at the transmission end of the system, where it is unavailable to the data user for adjustment. That limitation forecloses convenient tuning of the reference signal to optimize the replication of the particular data signal being transmitted.

These prior systems suffer also from susceptibility of the reference signal to degradation in transmission—making it unavailable in pure form at the reception end of the system for remixing. In some cases it has been seen as best to regenerate an equivalent reference signal in a local oscillator at the reception location, for use in remixing, but this approach has led to severe problems of frequency drift, frequency error and excess phase noise.

Prior fiberoptic communications strategies generally involve modulating an optical source with the data—for example, pulsing a laser under control of the data signal. Sources amenable to such modulation are subject to adverse power limitations, relatively high noise levels, or both.

Further, generally in prior fiberoptic communication systems the optical detector must follow a high-frequency data signal. With microwave-frequency data this condition requires very fast detectors, again leading to compromises in noise level, linearity and other detector parameters.

U.S. Pat. Nos. 4,390,974 to Siems, 4,420,260 to Martinelli, and 4,533,247 to Epworth are optical remote transmission systems using interferometric principles to enhance performance. Other United States Patents that exemplify the state of the art in interferometric modulators, demodulators, error correction, and related areas include 3,906,401 to Seidel, 4,709,978 to Jackel, 4,265,534 to Remijan, 4,721,385 to Jelalian, 4,730,171 to So, 4,568,408 and 4,360,272 to Schmadel, and 4,773,758 to Shaw.

Certain fiberoptic sensors, configured as Mach-Zehnder interferometers, bear some very superficial resemblance to the optical system of my invention. As will be more readily appreciated after studying the description of my invention which follows, they differ in several crucial and fundamental ways. In particular, the prior interferometric sensors generally have only one modulator, do not employ any beating (i.e., difference-frequency operation), and operate in a linear part of the interferometer transfer function.

In radio technology, some of the aspects of my invention that will be described below have conceptual analogs or counterparts that are known. As far as I am aware, however, heretofore such analogs have not been suggested for use in optical links. Even given such a suggestion, persons of ordinary skill would not perceive how to implement such analogs in optical hardware.

SUMMARY OF THE DISCLOSURE

In a remote optical transmission system for, say RF data, it is particularly desirable to develop an optical output signal at a difference frequency, relative to the input data signal and a reference signal. Such operation permits operation of detectors and amplifiers at only the difference frequency, which can be made considerably lower than the RF data frequency.

Furthermore it is particularly desirable to insert a reference signal locally at a receiving station of such a remote link. Such an operating arrangement allows the same reference signal to be used for mixing the output signal back up to the original data rate as is used for mixing down to the detector—without any need for transmitting the reference signal from a transmission station, or trying to generate a duplicate reference at the receiving station.

Moreover, in a remote optical data link it is desirable that the optical output signal component of interest constitute a relatively large fraction of the total light intensity at the detector. This condition favors operation of the system near an optical null.

None of the patented systems mentioned above, and no prior system of which I am aware, satisfies any of these three criteria. In fact, I know of no prior patent or literature which even suggests that these are desirable properties in a remote optical communication link.

Hence even the posing of these three operating criteria—difference-frequency operation, local insertion of reference signal, and near-null operation—appears to be part of the inventive contribution of the present invention. These three criteria may be regarded as objectives of the present invention.

My invention is a communication link for use with a data input signal from a data-input-signal source (in most cases not an element of my invention). The invention includes a reference-signal source for developing a reference signal, and also includes a source of optical radiation.

The invention additionally includes some means for defining two optical paths that carry the optical radiation. For purposes of generality and breadth in describing my invention, I shall refer to these means as the "path-defining means."

My invention also includes a beam splitter. The splitter receives optical radiation from the radiation source and causes respective fractions of the received optical radiation to propagate along the two optical paths.

In addition, the invention also includes at least two optical phase modulators. At least one of these is associated with the transmission portion of the communication link, and I shall accordingly refer to it (or them) by the phrase "transmission-associated optical phase modulator."

This modulator is connected to receive a data input signal from a data-input-signal source, and to impress upon the two optical paths a first relative phase difference that is related to the data input signal. A person skilled in this field will readily understand that this function can be performed by a single modulator which introduces a delay in one path or the other, or by plural modulators (still all in just one path or the other) that introduce an aggregate delay in only one path; or can be performed by one or more modulators in each path, whose overall net differential effect is to yield the "first relative phase difference" mentioned above. It is for this reason that I have referred above to "at least one" transmission-associated optical phase modulator.

The two optical paths carry optical radiation from the beam splitter and the transmission-associated modulator.

At least one other optical phase modulator is associated with the reception portion of the communication link; I shall accordingly refer to it by the phrase "reception-associated optical phase modulator." It is connected to receive the reference signal from the reference-signal source, and to impress upon the two paths a second relative phase difference that is related to the reference signal. This function too may be performed by any number of modulators in just one of the two paths, or by various numbers of modulators in both paths.

The invention also includes a beam combiner. This device receives optical radiation along the two optical paths and develops a composite of the received optical radiation.

In addition my invention includes an optical detector. The detector receives the composite radiation, and in response to that radiation develops an output signal.

The entire apparatus operates in such a way that the output signal includes a difference-frequency component—specifically, a particular component whose frequency is proportional to the difference between the frequency of the data input signal and that of the reference signal.

This "particular component" or difference signal arises from nonlinear effects in the joint operation of the beam combiner and detector. These effects can be made to include the addition of optical-wave amplitudes at the combiner, and a squaring function in the transition from amplitude to intensity domain which occurs at the detector.

The foregoing may be a description of my invention in its broadest or most general form. From what has been said already it will be understood that such a form satisfies the first of the three criteria or objectives mentioned above for a remote optical data link—namely, development of a difference frequency, permitting relatively low-frequency operation of the detector and associated electronic or analogous circuitry.

I prefer, however, to practice the invention with certain additional features or characteristics. These optimize enjoyment of various benefits of the invention.

For example, I prefer to add some means for deriving a modified output-signal component at a sum frequency. These means, again for generality and breadth, I shall call the "signal-mixing means."

They are connected to receive the difference-frequency particular component of the output signal from the detector and the reference signal from the reference-signal source. The signal-mixing means derive a modified output-signal component at a frequency that equals the sum of the frequency of the particular component of the output signal and the frequency of the reference signal.

Thus the identical reference-signal frequency is first subtracted in developing the "particular component" or difference frequency, and then added in developing the modified output-signal component. The latter modified output-signal component is thereby made very accurately proportional to the frequency of the data input signal—substantially independent of the reference signal.

I prefer also to arrange my data-link system so that the splitter and the transmission-associated modulator are at a transmission location with the input-signal source; and the reference-signal source, reception-associated modulator, combiner and detector are at a reception location that is remote from the transmission location. (The data source may of course take the form of a relay device, or simply an incoming signal path from yet another location.) The optical paths carry the optical radiation between the transmission and reception locations.

This arrangement is preferred because the reference-signal source is directly available at the reception location. Its stability can be monitored or controlled at that location if desired; more importantly, however, if mixing means such as just discussed are in use, the reference signal can be applied directly to the mixing means without any provision of a separate (second or third) optical path to carry that signal from the transmission location.

As will be recalled, this is the second of the desired operating criteria or objectives introduced earlier. Within the context of my present invention considered broadly, in a long-path interferometer the two optical paths can be matched sufficiently well, and thereby made sufficiently equal in susceptibility to effects from the environment—at least over short time periods—that relative phase differences are transmitted faithfully. Given such short-time fidelity, the point at which the reference signal is inserted becomes immaterial.

I prefer also to use at least one optical fiber for the two optical paths, carrying the optical radiation from the beam splitter and modulator. The two paths can respectively comprise two modes in a single optical fiber, or can respectively comprise time-separated channels sharing a single optical route.

If desired, the paths can comprise at least one optical transmission route (used by one or both paths) through free space. Such a system can use a projection or reception telescope, or both, as appropriate.

I consider particularly desirable the use of a beam combiner that develops the composite signal by adding respective amplitudes of the optical radiation received along the two paths—so that the detector receives an optical signal in which the amplitude is the sum of the added amplitudes. This amplitude-additive condition is most readily met when the data and reference optical signals possess some degree of coherence.

Such coherence, as is well known, can be straightforwardly achieved by employing an optical source that provides a beam which is at least partly coherent. An optimal source is thus a laser, but other sources with adequate coherence pathlength can be used in appropriate applications, as will become clear to persons skilled in this field.

With a coherent source, the optical data link of my invention takes recognizable shape as an interferometer, and particularly one of the Mach-Zehnder type. The beam splitter and combiner respectively define the input and output ends of the interferometer; for greatest simplicity the data signal is applied to phase-modulate one side or leg of the interferometer, and the reference signal is applied to phase-modulate the other.

I prefer also to apply another phase-modulating device in one of the two legs of the interferometer, and to connect this device to respond to certain signal components from the detector. The response is preferably such that this modulating device introduces a servocontrolled phase bias—and the bias is such as to bring the time-average optical signal to very nearly a null in intensity.

With this phase-feedback subsystem, my invention thus satisfies the third operating criterion or objective mentioned earlier, of a data link that operates at minimum intensity, where shot noise and other intensity-related noise are at a minimum, and where nonlinear components (those that generate the usable signal) represent the maximum possible fraction of the optical energy. The phase bias introduced by this subsystem compensates for any environmentally developed errors or changes in the relative pathlength—which validates the earlier-mentioned assumption that the two optical paths can be equalized in their susceptibility to environmental influences.

This preferred subsystem includes an amplifier connected to receive the output signal from the detector, and to amplify the output signal for utilization (as generally needed anyway in most practical systems); and some compensation means for analyzing the amplified output signal and applying a phase bias to the optical system. Again, these latter means will be called the "compensation means."

To drive toward a null, such compensation means require information about the sense, as well as the amplitude, of imbalance or offset from the null. I prefer to provide such information by including some means for impressing a relative-pathlength dither upon the two optical paths. These will be called the "dither means."

The compensation means are connected to receive the amplified output signal from the amplifier, and are responsive to the amplified output signal. When the dither means are operating, the compensation means detect the presence, amplitude and sense of any pathlength imbalance, and apply phase bias of appropriate sign and magnitude.

The foregoing operational principles, objectives and advantages of the invention will be more fully appreciated upon consideration of the following detailed description, with reference to the appended drawings, of which:

DETAILED DESCRIPTION OF THE PREFERRED EMBODIMENTS

Figure 1:
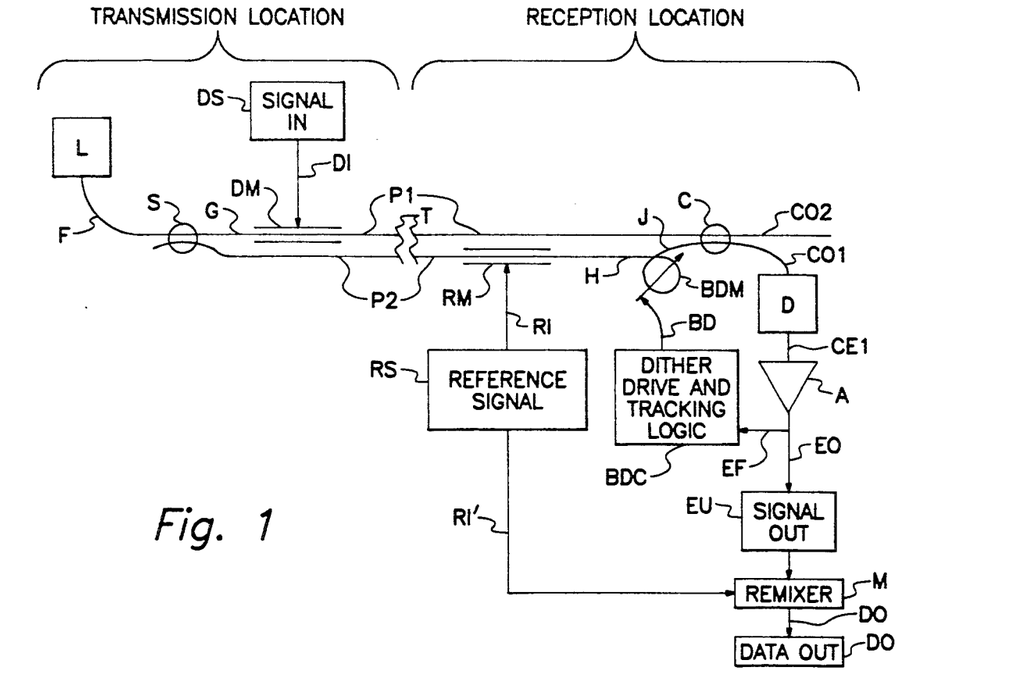
FIG. 1 is a block diagram showing assembly of a complete preferred embodiment of my invention from generally known devices.

As seen in FIG. 1, at least partially coherent optical radiation from a continuously operating (i.e., "CW") source such as a laser diode L proceeds along a path such as an optic fiber F to a beam splitter S, which divides the radiation and directs generally equal fractions into two paths P1, P2. A fiberoptic coupler serves as the splitter S. The path F from the source L to the splitter may be in part a free-space path, or may include other elements (such as imaging components), or both.

One path P1 of the two includes an initial entry segment G leading to a data modulator DM. The data modulator DM also receives data input from a data source DS (often not part of my invention), along an electrical or other data-input line DI. In the modulator, these data phase-modulate the optical radiation in one path P1.

That is, the data modulator responds to the data input DI by impressing a proportional or otherwise systematically related phase change upon the path P1—or, as it may alternatively be conceptualized, upon the optical radiation passing along the path P1. The phase shift introduced in the data modulator DM also constitutes a first relative phase difference between the two optical paths P1 and P2.

The systematic relationship between the data input DI and the magnitude of phase shift introduced by the data modulator DM need not be a simple proportionality. Predistortion may be introduced for any of a great number of reasons ranging from theoretical to economic. One objective, for example, may be to correct for distortions elsewhere in the system.

The components introduced in the preceding paragraphs are all at a transmission location. Optical radiation passes along the two paths P1, P2 from that transmission location across the distance of desired telecommunication T, to a reception location—where all the remaining components of the system are.

At the reception location, the other path P2 of the two (i.e., the path in which no phase shift is introduced at the transmission location) leads to a reference modulator RM. This modulator also receives a reference input from a reference source RS, along an electrical or other reference-input line RI. In this modulator, the reference input phase-modulates the optical radiation in the reference path P2.

In other words, the reference modulator responds to the reference input RI by impressing a proportional or otherwise systematically related phase change upon the path P2—or, as suggested earlier for the data modulator, upon the optical radiation passing along the path P2. The phase shift introduced in the reference modulator RM also constitutes a second relative phase difference between the two optical paths P1 and P2.

The second path P2 includes an additional segment H from the reference modulator RM to a bias-and-dither modulator BDM, and then a further segment J from the latter modulator to a beam combiner C. The functions of the bias-and-dither modulator BDM may be separated as convenient for provision by two separate modulators, one for bias and one for dither; both these functions will shortly be discussed in detail.

The combiner C, like the splitter S, may be a fiber-optic coupler. The combiner has the property of forming a composite of the optical signals in the two paths P1, P2 by adding their amplitudes—the amplitudes of the electromagnetic vectors that constitute the propagating optical waves. The amplitude-additive character of this device is considered important in the operation of my invention.

Without amplitude addition (e.g., if the two optical-signal intensities are simply collected in parallel on a common detector or a pair of detectors), the data and reference optical phase signal components produce no corresponding intensity fluctuations, so that as a practical matter the data signal cannot be extracted effectively.

As mentioned earlier, obtaining an amplitude-additive composite at the combiner C requires at least partial coherence in radiation from the source L; however, the degree of coherence required need not closely approach an ideal. For an imperfectly coherent source L, the relationship between the coherence length of the source and the optical length difference between the two paths P1, P2 will establish the performance of the system; and for many applications the acceptable performance may correspond to rather short coherence lengths.

A beam combiner C generally has two output legs for output optical signals: composite optical ("CO") outputs CO1, CO2. One leg CO1 or CO2 carries the sum and the other carries the difference of the two inputs P1, J.

FIG. 1 shows only one leg CO1 in use. This can be the sum-output leg, with the two optical signals biased (at the bias-and-dither modulator BDM or the reference modulator RM) to be out of phase.

As a practical matter, however, the other leg CO2 can also be employed for various purposes such as normalization of the signal level in the other channel, and more importantly partial noise cancellation. In particular, combining (as by division) the signals derived from the two optical channels can effectively eliminate those noise components arising in the source L, input path F, and common environmental influences anywhere along the paths P1, P2—from the splitter S to the combiner C, inclusive.

The selected primary output or composite optical signal CO1 is applied to a detector D, which responds to the intensity of the optical signal CO1. As the intensity is quadratic in amplitude, the detector output signal contains components proportional to the square of the sum (or, with the optical signals out of phase, effectively the square of the difference) between the optical signals respectively reaching the combiner in the two input legs P1 and J.

The detector D in principle need not be an optoelectric device, as fluidic, optical or other systems can be envisioned. In principle these will function as described below, except for the substitution of signal medium.

Typically, however, the detector D is optoelectric and develops a composite electrical signal CE1 proportional to the intensity in the composite optical signal CO1. The nonlinear characteristic of the intensity and thereby of the detector, relative to optical amplitudes, as is well known yields various sum, difference, and other intermodulation frequency components in the composite electrical signal CE1 produced by the detector D.

This composite electrical signal CE1 is applied to a buffer-amplifier A, which in turn develops lower-impedance filtered electrical output and feedback signals EO, EF. From the various frequency components contained in the composite electrical signal CE1 from the detector, filters in the buffer-amplifier A extract signals at the difference between the frequencies of the data input DI and the reference input RI.

The buffer-amplifier A thus forms electrical output and feedback signals EO, EF. Both are proportional to the difference-frequency component in the composite electrical signal CE1 from the detector.

The feedback signal EF from the amplifier A is directed to a bias-and-dither control circuit BDC. This circuit block performs two functions.

One of these functions is to develop and continuously adjust a bias signal for application through a signal line BD to the bias-and-dither modulator BDM. The bias signal is of such magnitude and sign that the resulting optical phase bias in the modulator BDM will neutralize or compensate for any longterm-average phase difference between the two paths P1 (including the segment G) and P2 (including the segments H and J).

In other words, the bias signal is continuously adjusted to servo the average phase difference to zero—or to one hundred eighty degrees, when the two optical inputs to the combiner C are to be out of phase for use in the amplitude-summing channel CO1 of the combiner C. The bias feedback loop EF-BDC-BD-BDM thus holds the average intensity on the detector D to a minimum. In the process it minimizes intensity-dependent noise components such as photodetector shot noise, while maximizing the relative magnitude of the difference-frequency component in the detector signal CE1.

The other function of the control circuit BDC is to generate an alternating signal or dither signal which when applied along the signal line BD to the bias-and-dither modulator BDM causes the optical pathlength/phase difference between the two paths P1 and P2 to oscillate about the average value—or more specifically, when bias is being applied as desired, to oscillate very nearly about zero (or one hundred eighty degrees) phase difference.

When the time-average path or phase difference drifts away from zero, as generally it constantly does in one direction or the other, the optical dither becomes asymmetrical about the zero-difference point. This results in a signal component in the detector D (or in another detector disposed to receive the beam in the other leg CO2 of the combiner C) at the frequency of the electrical dither signal.

The electrical phase of this dither-frequency signal depends directly on the direction of optical phase drift from zero. The dither-frequency signal is included in the feedback signal EF from the amplifier A to the bias-and-dither control circuit BDC, and used to control the sense of the phase bias.

In summary a bias-and-dither signal BD passes from the bias-and-dither control circuit BDC to the bias-and-dither modulator BDM, causing the latter to impress both phase bias and phase dither upon the optical system. The dither component in the signal BD provides the sense information required for proper control of the bias component in the same signal BD.

Although the preferred embodiment of FIG. 1 is believed to be unique and unobvious, the concepts of bias and dither are well known in servocontrol systems of many different kinds. Accordingly the internal design and implementation of the bias-and-dither control circuit BDC and the frequency-selective buffer-amplifier A are well within the state of the art in electronic, fluidic and other circuit designs and need not be detailed in this document.

The electrical output EO from the amplifier A can be directed to an electrical-signal utilization device EU, and used in its difference-frequency form as desired. Alternatively, or in addition, this output signal can be passed to a remixer M for combination with a reference input signal RI′.

This latter signal can be substantially identical to the reference input at line RI to the reference modulator RM; or in any event can be at precisely the same frequency. Hence when it is conventionally mixed at M with the difference frequency, the data-output line DO carries precisely a sum-frequency component with precisely the same content as the data-input line DI at the transmission location.

The precision or fidelity with which this sum-frequency data-output component DO replicates the original data input DI is extraordinarily high. This excellent fidelity arises in part from the fact that the reference source RS is local at the reception location, and therefore can be used substantially identically for both (1) mixing down to the difference frequency in the combiner C and detector D, and (2) mixing back up to the data frequency in the remixer M.

As will be understood, this sum-frequency component, substantially identical to the data input DI, must be isolated and extracted—in the mixer M or in the input stages of a suitable data-utilization device DU—from other frequency components, dc offsets, etc., in the electrical output signal EO.

The process of mixing down to the difference frequency, considered to occur in the beam combiner C and detector D, introduces an overall system transfer function that is a sinusoid or Bessel function. In some cases, particularly digital signals, this transfer function can be disregarded—since the sine or Bessel function preserves the general relation between "0" and "1" signal levels, and between positive and negative signals.

In other cases compensation may be desired and can be inserted in the form of an inverse sine or Bessel function at any of various points in the system—e.g., in the data-source device DS, or the entry stages of the data-utilization device DU. Another possibility is to modify the characteristic of the data modulator DM to provide the desired inverse sine or Bessel response; this corresponds to the "predistortion . . . to correct for distortions elsewhere in the system", mentioned earlier in discussion of the data modulator DM.

As also previously mentioned, the various portions of the optical paths F, P1, P2 in my system may include segments that pass through free space—that is, segments not constrained within optic fibers. These segments may be appropriately coupled with transmission or reception telescopes to spread or concentrate the beam as appropriate.

I have also mentioned above, and have included in certain of the appended claims, that within the scope of my invention as set forth in those specific claims "along at least one segment the two optical paths respectively comprise two modes in a single optical fiber."

For purposes of definiteness in presenting exemplary embodiments, it will be recognized by those skilled in the art as inherent in the block diagram of FIG. 1 that such a single optical fiber corresponds or could correspond to certain portions of paths P1 and P2 considered together. Specifically, those portions are the portion of path P1 between the signal modulator DM and the combiner C, and the portion of path P2 between the splitter S and the reference modulator RM.

Similarly mentioned and included in certain claims is the language: "along at least one segment the two optical paths respectively comprise time-separated channels sharing a single optical route."

Again for definiteness, skilled artisans will recognize as inherent in FIG. 1 that time modulation corresponds or could correspond to operation of switches, represented for purposes of this embodiment of my invention by the symbols S and C; and that the above-identified portions of paths P1 and P2 respectively represent the "time-separated channels sharing a single optical route."

I have also alluded to and included in certain claims the recitation: "along at least one segment the two optical paths comprise at least one optical transmission route through free space."

Figure 3:
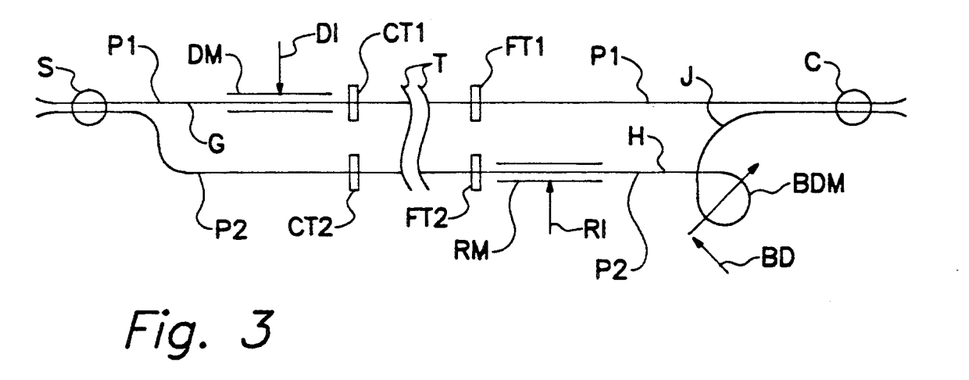
FIG. 3 is a partial system diagram showing telescopes as would be used for free-space path segments.

As before, those skilled will see as inherent in the diagram correspondence between an optical transmission route through free space and the above-identified portions of paths P1 and P2. Similarly it will be recognized as inherent in the block diagram of FIG. 3 that an optical transmission route through free space corresponds or could correspond to, e.g., the portions of paths P1 and P2 between the telescopes CT1 and FT1, and between the telescopes CT2 and FT2, respectively.

Also mentioned above and appearing in certain claims is this: "at least one modulator is an electrooptical modulator, and the input signal is an electrical signal."

For definiteness yet again, persons skilled in this field will recognize as inherent in FIG. 1 identification of an electrooptical modulator or modulators with one or both of the data-signal modulator symbol DM and the reference modulator symbol RM.

Additionally mentioned and appearing in certain of the claims is language to the effect that "at least one modulator comprises"—and elsewhere in the claims that "compensation means comprise"—"a medium for passing optical radiation; and mechanical means for stretching the medium." Still elsewhere I have included recitation that "the medium comprises an optical fiber; and the stretching means comprise a motor or solenoid attached to the fiber for stretching the fiber."

As before merely for purposes of definiteness of example, individuals qualified in this area will perceive as inherent in the diagram symbolism of the "mechanical means for stretching", the "stretching means", and the "motor or solenoid" by the two top and bottom horizontal lines labeled DM, RM in either modulator symbol (or both).

Yet further mentioned above and included in certain of the claims is the phrase "an optical fiber coiled about the stretching means". As in the previous cases, the skilled artisan will recognize as inherent representation of this coiled fiber by the central line in either modulator symbol (or both).

The relative phase modulations required for data, reference, bias and dither can be provided by various types and combinations of modulators—depending upon the magnitude and speed of modulation or bias change required. In general, preferred modulator types will be electrooptical in the broad generic sense of accepting an electrical input signal and producing optical phase change in response. The term "electrooptical," however, is customarily or at least very often reserved for modulators that incorporate a medium whose refractive index varies in relation to voltage applied across the medium. This type of device in fact will be required in most practical embodiments of my invention for the data and reference modulators DM, RM—since they are the only types capable of responding accurately at microwave or UHF frequencies—as noted earlier, the data frequencies most likely to be of interest for remote-link applications of my invention.

Bias and dither, however, do not require such speed and may be more economically provided in what may be called electromechanical modulators. By this I mean devices that incorporate a medium for passing optical radiation, and some electromechanical means for stretching the medium.

For example, the medium may include an optical fiber of (FIG. 4) coiled about the mechanical stretching means. The stretching means may include a piezoelectric element for forcibly expanding the coil of fiber, or alternatively a motor or solenoid attached to the fiber for stretching the fiber.

Figure 4:
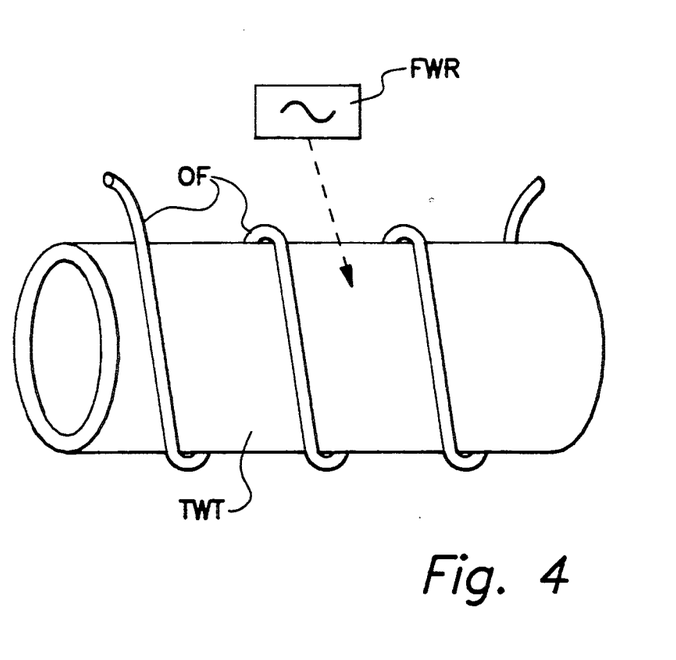
FIG. 4 is a diagrammatic showing of one type of piezoelectric system for phase modulation.

In the case of dither generation, appropriate intermediate modulation speeds may be attained in a electromechanical device by arranging a piezo element in the form of a cylindrical thin-walled tube TWT, and driving the piezoelectric element at a resonant frequency FWR of the wall thickness. Similar devices resonating in hoop mode are known in the art to provide high frequencies for mechanical resonance, and satisfactory fiber-stretching properties for use in CW phase modulation.

Figure 2:
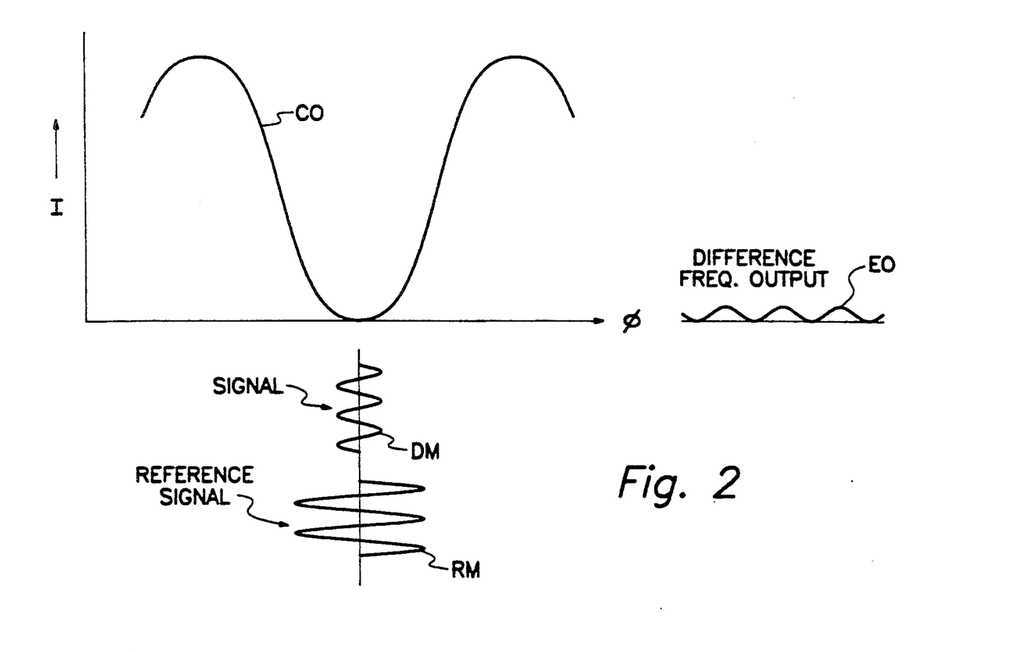
FIG. 2 is a signal diagram showing relationships between data-input, reference-input, composite-optical, and difference-output signals in the FIG. 1 embodiment.

FIG. 2 shows in conceptual form how the difference-frequency component of the composite electrical signal CE (at the upper right in the diagram) is related to the data input signal DI and reference input signal RI (at lower left)—through the composite optical signal CO.

The upper left portion of the diagram is a plot of intensity versus phase shift, or phase match, for the composite optical signal. In other words, the curve CO represents the intensity of the composite optical signal as a function of instantaneous net phase shift, due to all causes, between the optical signals in the two paths P1, P2 at the combiner C.

When the signals in the two paths are precisely out of phase, and the summing leg CO1 of the combiner C is used, the two beams always interfere destructively——and the intensity is always at the null point that appears near the center of the diagram. In operation of my invention, the bias-and-dither circuit BDC and modulator BDM together servocontrol the longstern average phase shift to this null condition, overcoming the effects of any environmentally induced phase mismatch between the two paths P1, P2 and injecting a 180-degree shift so that the two signals arrive exactly out of phase.

In the lower left portion of the diagram are auxiliary plots of phase shift versus time (the latter being along the vertical axis in the auxiliary plots), for the data and reference modulators DM, RM. Both these phase-shift signals cause the system to operate along the curve CO, oscillating rapidly about the null condition.

(The dither signal could be similarly plotted, and would appear as a much slower oscillation but likewise nominally centered at the null. Instantaneous errors in that centering, in fact, give rise to bias adjustment that tends to restore a centered condition, as explained above.)

By making the reference modulation amplitude considerably larger than the data amplitude, the sum of the two oscillations can be constrained to pass through the null condition twice for each data cycle in an orderly fashion. This arrangement maintains the operating assumptions required for orderly operation of the heterodyning or mixing function in the combiner C and detector D.

As the data and reference shifts DM and RM drive the system back and forth along the phase axis of FIG. 2, the optical intensity in the system rises and falls, following the curve CO. Since both data and reference inputs are operating simultaneously, it is actually their resultant that drives the system along the curve CO.

In phase-shift terms, and in the precursor optical amplitude as well, this resultant is merely additive. Due to the quadratic relation between intensity and amplitude, however, as explained earlier, the intensity of the radiation reaching the detector D has an embedded difference-frequency component.

The reference source RS is adjusted to select a reference modulation frequency that is very near the data frequency—so that the difference frequency in the detector D and buffer-amplifier A (FIG. 1) can be as much as orders of magnitude smaller than the data rate. In FIG. 2 this condition is represented by similar spacing of the data-and reference-signal peaks and nodes along the time axis.

When this adjustment has been made, even the relatively slow detector and amplifier can follow the difference-frequency signal. That signal accordingly appears at the output terminal EO (FIG. 1), and the reference source RS is said to be "tuned" for the data signal of interest. While this tuning can be accomplished manually if desired, it can also be performed automatically or dynamically by a generally conventional servosystem (not shown).

In the upper right portion of FIG. 2 is an auxiliary plot of signal magnitude (displayed vertically) versus time for the difference-frequency signal component EO. This component is extracted from the complex signal that results from interaction of the two modulations DM and RM: when their resultant drives the system in either direction from null, a positive intensity excursion and positive electrical output EO results.

For purposes of clarity in the illustration, the frequency of this waveform as drawn is only a small multiple of that in the data and reference signals at lower left; but as mentioned above the difference signal may be made much slower than the data rate. The time scale in the upper-right plot may be regarded as compressed by several orders, relative to that in the lower-left plots.

As mentioned above, the the low average light level near the null point of FIG. 2 minimizes shot noise. Other signal-level relationships can also be made favorable, as will be seen from the following analytical overview of the optical-system response to a pair of data signals $\underline{a} \sin \underline{F}t + \underline{b} \sin \underline{G}t,$ when mixed in the combiner C with the reference signal derived from the local oscillator at the reception location, $$\underline{r} \sin \underline{R}t,$$

in the presence of an error e in interferometer bias. The amplitudes a, b and r must be in consistent units—e.g., measured in units of phase shift—and the values F, G and R are frequencies. The resulting ratio of output intensity to input intensity is:

$$\tfrac{1}{2}[1 - \cos(\underline{r} \sin \underline{R}t + \underline{a} \sin \underline{F}t + \underline{b} \sin \underline{G}t + \underline{e})].$$

Expanding this expression yields dc terms:

$$(\tfrac{1}{8})(\underline{r}^2 + \underline{a}^2 + \underline{b}^2 + \underline{e}^2)$$

and the signals and intermodulation products within the output frequency band—namely, first, the intermediate-frequency output signals:

$$\tfrac{1}{4}\underline{a}\,\underline{r} \cos(\underline{R}-\underline{F})t + \tfrac{1}{4}\underline{b}\,\underline{r} \cos(\underline{R}-\underline{G})t$$

and, secondly, the intermediate-frequency two-tone third order intermodulation terms:

$$(1/32)\underline{a}^2\,\underline{b}\,\underline{r} \cos[\underline{r}-(2\underline{a}-\underline{b})]t + (1/32)\underline{a}\,\underline{b}^2\,\underline{r} \cos[\underline{r}-(2\underline{b}-\underline{a})]t.$$

The greatest dc term is proportional to the square of the local-oscillator reference-signal amplitude (in phase-shift or other consistent units), while each signal term is linear in that same amplitude. Optimum signal-to-noise ratio therefore is achieved with the reference-signal amplitude increased until the shot noise just dominates detector noise.

The ratio of signal to intermodulation products is $1/(8\,\underline{a}\,\underline{b})$, or loosely speaking, $1/(8\cdot[\text{signal}]^2)$. This figure of merit is as high as in the conventional electrooptic-modulator case.

Electrooptic modulators for use in my invention as commercially available from Crystal Technology Inc. are operable to frequencies of 10 GHz. General Electric Corporation has indicated its intent to offer such modulators for operation to 50 GHz soon.

Hewlett-Packard Laboratories has described preliminary work on modulators of the aperiodic-intermittent-interaction type, to frequencies approaching 40 GHz, but these are subject to nonlinear phase response across the frequency band. I have reported lab work aimed at mitigating this problem—see "Noncollinear traveling wave electro-optic Bragg cell", *SPIE Acousto-Optic, Electro-Optic, and Magneto-Optic Devices and Applications* Vol. 753, page 114 (1987).

Wiltron and APC offer electrical signal connectors good to various frequencies from 40 to 60 GHz.

Detectors, by comparison, are also commercially available as from Ortel for operation to 10 GHz (wavelength to 1.3 micrometer), and from General Electric to 25 GHz (wavelength 0.8 micrometer currently, and 1.3 micrometer soon). Laboratory reports from AT&T Bell preliminarily indicate detector response to 36 Hz (wavelength 1.3 micrometer, quantum efficiency 45%).

Hence, although present commercial modulators and detectors are comparable in frequency operating range, a disparity of perhaps 15 to as much as 25 GHz may soon appear in commercial units. That is, modulators may operate to 50 GHz but detectors to only 25 or 35 GHz.

If this frequency gap materializes, then my present invention may become particularly useful since it particularly accommodates exactly such a disparity between modulator and detector operation.

The foregoing disclosure is intended to be merely exemplary, not to limit the scope of the invention—which is to be determined by reference to the appended claims.

I claim:

1. A communication link for use with a data input signal having at least one data-input-signal frequency, from a data-input-signal source, and comprising:

a source of optical radiation;

means defining two optical paths for carrying optical radiation;

a beam splitter for receiving optical radiation from the radiation source and causing respective fractions of the received optical radiation to propagate along the two optical paths;

at least one transmission-associated optical phase modulator connected to receive the data input signal from the data-input-signal source, and to impress upon the two optical paths a first relative optical phase difference that is related to the data input signal;

said two optical paths carrying the optical radiation from the beam splitter and modulator;

a reference-signal source for developing a reference signal having a reference-signal frequency, said reference-signal source being remote from the splitter and the transmission-associated modulator;

at least one reception-associated optical phase modulator connected to receive the reference signal from the reference-signal source, and to impress upon the two paths a second relative optical phase difference that is related to the reference signal, said reception-associated modulator being remote from the splitter and the transmission-associated modulator;

a beam combiner for receiving optical radiation along the two optical paths and developing a composite of the received optical radiation, said combiner being remote from the splitter and the transmission-associated modulator; and an optical detector for receiving the composite radiation from the combiner and in response thereto developing an output signal;

said output signal including a component whose frequency is proportional to the difference between the frequency of the data input signal and the frequency of the reference signal.

2. The link of claim 1, further comprising:

signal mixing means, connected to receive said particular component of the output signal from the detector and connected to receive the reference signal from the reference-signal source, for deriving a modified output-signal component at a frequency that equals the sum of the frequency of said particular component of the output signal and the frequency of the reference signal;

whereby the modified output-signal component is proportional to the frequency of the data input signal, substantially independent of the reference signal.

3. The link of claim 1, wherein:

the splitter and the transmission-associated modulator are disposed at a transmission location with the data-input-signal source;

the reference-signal source, reception associated modulator, combiner and detector are disposed at a reception location remote from the transmission location; and the optical paths carry the optical radiation between the transmission and reception locations.

4. The link of claim 3, wherein:

along at least one segment, the two optical paths comprise at least one optical transmission route through free space; and the optical transmission route traverses at least one telescope at the transmission location and at least one telescope at the reception location.

5. The link of claim 1, wherein: along at least one segment, the two optical paths respectively comprise two modes in a single optical fiber.

6. The link of claim 1, wherein:

along at least one segment, the two optical paths respectively comprise time-separated channels sharing a single optical route.

7. The link of claim 1, wherein:

along at least one segment, the two optical paths comprise at least one optical transmission route through free space.

8. The link of claim 1, wherein:

the two optical paths comprise at least one segment comprising at least one optical fiber for carrying the optical radiation from the beam splitter and modulator.

9. The link of claim 1, wherein:

the beam combiner develops said composite by adding respective amplitudes of the optical radiation received along the two paths; and the detector receives a sum of said added amplitudes, and develops the frequency-difference component through operation of a nonlinear relationship between optical intensity and amplitude.

10. The communication link of claim 1, wherein:

at least one phase modulator is a single unit that impresses a phase difference upon the optical radiation propagating in only one of the two optical paths.

11. The link of claim 10, wherein:

at least one modulator is an electrooptical modulator, and the input signal is an electrical signal.

12. The link of claim 10, wherein at least one modulator comprises:

a medium for receiving optical radiation from the beam splitter, said medium having refractive index that varies in relation to voltage applied across the medium; and means, responsive to the received data input signal from the data-input-signal source, for applying across the medium a voltage related to the received data input signal.

13. The link of claim 10, wherein at least one modulator comprises:

a medium for passing optical radiation; and mechanical means for stretching the medium.

14. The link of claim 13, wherein:

the medium comprises an optical fiber coiled about the stretching means; and the stretching means comprise a piezoelectric element for forcibly expanding the coil of fiber.

15. A communication link for use with a data input signal having at least one data-input-signal frequency, from a data-input-signal source, and comprising:

a source of optical radiation;

means defining two optical paths for carrying optical radiation;

a beam splitter for receiving optical radiation from the radiation source and causing respective fractions of the received optical radiation to propagate along the two optical paths;

at least one transmission-associated optical phase modulator connected to receive the input signal from the input-signal source, and to impress upon the two optical paths a first relative phase difference that is related to the input signal;

said two optical paths carrying the optical radiation from the beam splitter and modulator;

a reference-signal source for developing a reference signal;

at least one reception-associated optical phase modulator connected to receive the reference signal from the reference-signal source, and to impress upon the two paths a second relative phase difference that is related to the reference signal;

a beam combiner for receiving optical radiation along the two optical paths and developing a composite of the received optical radiation;

an optical detector for receiving the composite radiation and in response thereto developing an output signal;

said output signal including a component whose frequency is proportional to the difference between the frequency of the input signal and the frequency of the reference signal;

an amplifier connected to receive the output signal from the detector and to amplify the output signal for utilization;

means for impressing a third relative phase difference, alternating at a dither frequency, upon the two optical paths; and compensation means, connected to receive the amplified output signal from the amplifier and responsive to the amplified output signal, for detecting the presence and determining the amplitude and sense of any environmentally developed changes in the relative pathlength, and for impressing a relative phase bias upon the two optical paths to compensate for the detected changes.

16. The link of claim 15, wherein the compensation means comprise:

a medium for passing optical radiation; and mechanical means for strectching the medium.

17. The link of claim 16, wherein:

the medium comprises an optical fiber; and the stretching means comprise a motor or solenoid attached to the fiber for stretching the fiber.

18. The link of claim 15, wherein the dither-impressing means comprise:

an optical fiber arranged to form a coil;

a piezoelectric element, disposed within the coil, for forcibly expanding the coil of fiber when electrically driven; and means for applying a cyclical voltage to the piezoelectric element to cyclically drive the piezoelectric element electrically.

19. The link of claim 18, wherein:

the piezoelectric element is in the form of a cylindrical tube having an annular wall; and said cyclical voltage drives the piezoelectric element at a resonant frequency of the annular-wall thickness.

20. A communication link for use with a data input signal, having at least one data-input-signal frequency, from an input-signal source; and comprising:

a source of optical radiation;

a beam splitter for receiving optical radiation from the radiation source and causing respective fractions of the received optical radiation to propagate along two optical paths;

at least one transmission-associated optical phase modulator connected to receive the data input signal from the data-input-signal source, and to impress upon the two optical paths a first relative phase difference that is related to the input signal;

the splitter and the transmission-associated modulator being disposed at a transmission location with the data-input-signal source;

a reference-signal source for developing a reference signal having a reference-signal frequency;

at least one reception-associated optical phase modulator connected to receive the reference signal from the reference-signal source, and to impress upon the two paths a second relative phase difference that is related to the reference signal;

a beam combiner for receiving optical radiation along the two optical paths and developing a composite of the received optical radiation;

an optical detector for receiving the composite radiation and in response thereto developing an output signal;

said output signal including a particular component whose frequency is proportional to the difference between the frequency of the data input signal and the frequency of the reference signal;

the reference-signal source, reception-associated modulator, combiner and detector being disposed at a reception location remote from the transmission location;

a pair of optical fibers, constituting at least part of the two optical paths, for carrying the optical radiation from the beam splitter and modulator, at the transmission location, to the reception location;

signal mixing means, connected to receive said particular component of the output signal from the detector and connected to receive the reference signal from the reference-signal source, for deriving a modified output-signal component at a frequency that equals the sum of the frequency of said particular component of the output signal and the frequency of the reference signal;

whereby the modified output-signal component is proportional to the frequency of the data input signal, substantially independent of the reference signal;

an amplifier connected to receive the output signal from the detector and to amplify the output signal for utilization;

means for impressing an alternating third relative phase difference, which serves as dither, upon the two optical paths; and compensation means, connected to receive the amplified output signal from the amplifier and responsive to the amplified output signal, for detecting the presence and determining the amplitude and sense of any environmentally developed changes in the relative pathlength, and for biasing the dither to compensate for detected changes.

21. The communication link of claim 20, wherein:
at least one of the modulators is an electrooptical modulator, and the input signal is an electrical signal.

22. The communication link of claim 20, wherein:
the source of optical radiation is a spatially coherent source.

23. The communication link of claim 20, wherein:
the source of optical radiation is a laser.

* * * * *